United States Patent
Yu et al.

Patent Number: 5,841,280
Date of Patent: Nov. 24, 1998

[54] APPARATUS AND METHOD FOR COMBINED ACOUSTIC AND SEISMOELECTRIC LOGGING MEASUREMENTS

[75] Inventors: Gang Yu, Katy; Xiaoming Tang, Houston; Kurt-Martin Strack, Houston; Arthur Chuen Hon Cheng, Houston, all of Tex.

[73] Assignee: Western Atlas International, Inc., Houston, Tex.

[21] Appl. No.: 881,304

[22] Filed: Jun. 24, 1997

[51] Int. Cl.$^6$ .............................. G01V 11/00; G01V 1/40; G01V 3/18

[52] U.S. Cl. ...................... 324/323; 73/152.05; 181/102; 324/347; 324/353; 367/25

[58] Field of Search ..................................... 324/323, 348, 324/351–353; 73/152.05, 152.06, 152.08; 367/14, 25; 181/102; 702/6

[56] References Cited

U.S. PATENT DOCUMENTS

| | | | |
|---|---|---|---|
| 4,904,942 | 2/1990 | Thompson | 324/323 |
| 5,486,764 | 1/1996 | Thompson et al. | 324/323 |

*Primary Examiner*—Gerard Strecker
*Attorney, Agent, or Firm*—Richard A. Fagin

[57] ABSTRACT

A method for estimating porosity of an earth formation from measurements of acoustic energy traversing the earth formation and from measurements of seismoelectric voltages generated in the formation in response to the acoustic energy. The method includes the steps of measuring the acoustic energy traversing the earth formation and measuring said seismoelectric voltages generated in response to the acoustic energy traversing the formation. A seismoelectric signal is synthesized from the measurements of the acoustic energy using an initial value of the porosity. A difference is determined between the synthesized seismoelectric voltages and the measured seismoelectric voltages. The initial value of porosity is adjusted, and the steps of synthesizing the seismoelectric voltages from the acoustic signal, determining the difference, and adjusting the value of porosity are repeated until the difference drops below a predetermined threshold or the difference reaches a minimum value. The adjusted value of porosity which results in the difference being at the minimum is taken as the formation porosity. A particular embodiment includes estimating conductivity of fluid in the pore spaces of the formation by calculating the synthetic seismoelectric voltages using an initial value of conductivity; determining a difference between the synthetic seismoelectric voltages and the measured seismoelectric voltages; and adjusting the initial value of conductivity, and repeating the steps of calculating the synthetic seismoelectric voltages, determining the difference and adjusting the value of conductivity until the difference reaches a minimum.

15 Claims, 4 Drawing Sheets

Fig. 5 ns of formation

APPARATUS AND METHOD FOR COMBINED ACOUSTIC AND SEISMOELECTRIC LOGGING MEASUREMENTS

BACKGROUND OF THE INVENTION

1. Field of the Invention

The invention is related to the field of acoustic wellbore logging instruments. More specifically, the invention is related to detection and interpretation of electric fields generated in earth formations as a result of acoustic energy imparted to the formations by the transmitter on an acoustic wellbore logging instrument.

2. Description of the Related Art

Acoustic wellbore logging instruments are used for, among other purposes, making measurements for determining the elastic properties of earth formations penetrated by wellbores. These instruments are typically used in liquid-filled wellbores. The acoustic wellbore logging instrument typically includes at least one acoustic transmitter that periodically emits acoustic energy pulses, and at least one acoustic receiver that detects the acoustic energy after it has passed through the wellbore and through the earth formations along the wall of the wellbore. The signals generated by the acoustic receiver in response to the acoustic energy are recorded and interpreted to determine one or more specific characteristics of acoustic waves propagated in and around the liquid-filled borehole. The recorded signals are typically processed to obtain the acoustic waveform amplitude, the formation slowness (the inverse of the acoustic velocity), and the interval travel time ($\Delta t$). These measures of formation acoustic properties can be used to evaluate features of the earth formations including the existence of fractures in the earth formation, the mineral composition (lithology) of the earth formation, the fluid content of the pore spaces in the earth formations, and the mechanical properties of the earth formation such as compressive and shear strength. The recorded signals can also be processed to construct synthetic seismograms for use in correlating the acoustic well log measurements to surface-recorded seismic data and for calibrating velocity checkshot surveys.

A typical acoustic wellbore logging instrument is described in a sales brochure entitled, *Multipole Array Acoustilog*, Western Atlas Logging Services, Houston, Tex. (1993). The instrument described in this reference includes both monopole and dipole acoustic transmitters to impart acoustic energy pulses to the liquid-filled wellbore and to the earth formations, an array of receivers to detect acoustic waves propagated in and around the liquid-filled wellbore and/or propagated through the earth formation, and downhole power supplies and electronic modules to controllably operate the transmitters, and to receive and amplify the detected acoustic waves and process the acquired data for transmission to the earth's surface.

During operation of the acoustic wellbore logging instrument, the transmitter generates acoustic waves which travel to the rock formation through the liquid-filled wellbore. The propagation of acoustic waves in a liquid-filled wellbore is a complex phenomenon and is affected by the mechanical properties of several separate acoustical domains, including the earth formation, the wellbore liquid column, and the well logging instrument itself. The acoustic wave emanating from the transmitter passes through the liquid and impinges on the wellbore wall. This generates compressional acoustic waves and shear acoustic waves which travel through the earth formation, surface waves which travel along the wellbore wall, and guided waves which travel within the fluid column.

In generating the different types of acoustic waves just described, the wellbore wall, layers in the earth formation (called "bedding") roughness or "rugosity" of the wellbore wall, and fracturing of the earth formation can all provide significant discontinuities in the propagation path of the acoustic energy pulses. Therefore, the phenomena of wave refraction, reflection, and mode conversion lead to the presence of many acoustic waves in the borehole as the acoustic well logging instrument is being operated. The acoustic waves can be used, as previously explained, to evaluate fractures and lithology, fluid content, and rock mechanical properties. The acoustic waves alone only have limited utility for detecting zones in the earth formation having high fluid mobility, and limited utility for determining fluid chemistry contrasts between various layers of the earth formation. Fluid mobility and fluid chemistry contrast are important for more complete description and characterization of the earth formation. particularly the potential fluid production from wellbores drilled through the formation.

SUMMARY OF THE INVENTION

The invention is a method for estimating porosity of an earth formation from measurements of acoustic energy traversing the earth formation and from measurements of seismoelectric voltages generated in the formation in response to the acoustic energy. The method includes the steps of measuring the acoustic energy traversing the earth formation and measuring the seismoelectric voltages generated in response to the acoustic energy traversing the formation. A seismoelectric signal is synthesized from the measurements of the acoustic energy using an initial value of the porosity. A difference is determined between the synthesized seismoelectric voltages and the measured seismoelectric voltages. The initial value of porosity is adjusted, and the steps of synthesizing the seismoelectric voltages from the acoustic signal, determining the difference, and adjusting the value of porosity are repeated until the difference drops below a predetermined threshold or the difference reaches a minimum value. The adjusted value of porosity which results in the difference being at the minimum is taken as the formation porosity.

In a particular embodiment of the method of the invention, the electrical conductivity of fluid in pore spaces of the earth formations can be calculated. The particular embodiment includes the steps of measuring the acoustic energy traversing the earth formation and measuring the seismoelectric voltages generated in response to the acoustic energy traversing the formation. A seismoelectric signal is synthesized from the measurements of the acoustic energy using an initial value of fluid electrical conductivity. A difference is determined between the synthesized seismoelectric voltages and the measured seismoelectric voltages. The initial value of fluid electrical conductivity is adjusted, and the steps of synthesizing the seismoelectric voltages from the acoustic signal, determining the difference, and adjusting the value of conductivity are repeated until the difference drops below a predetermined threshold or the difference reaches a minimum value. The adjusted value of fluid electrical conductivity which results in the difference being at the minimum is taken as the fluid electrical conductivity.

DESCRIPTION OF THE PREFERRED EMBODIMENT

1. Apparatus of the Invention

Figure 1:
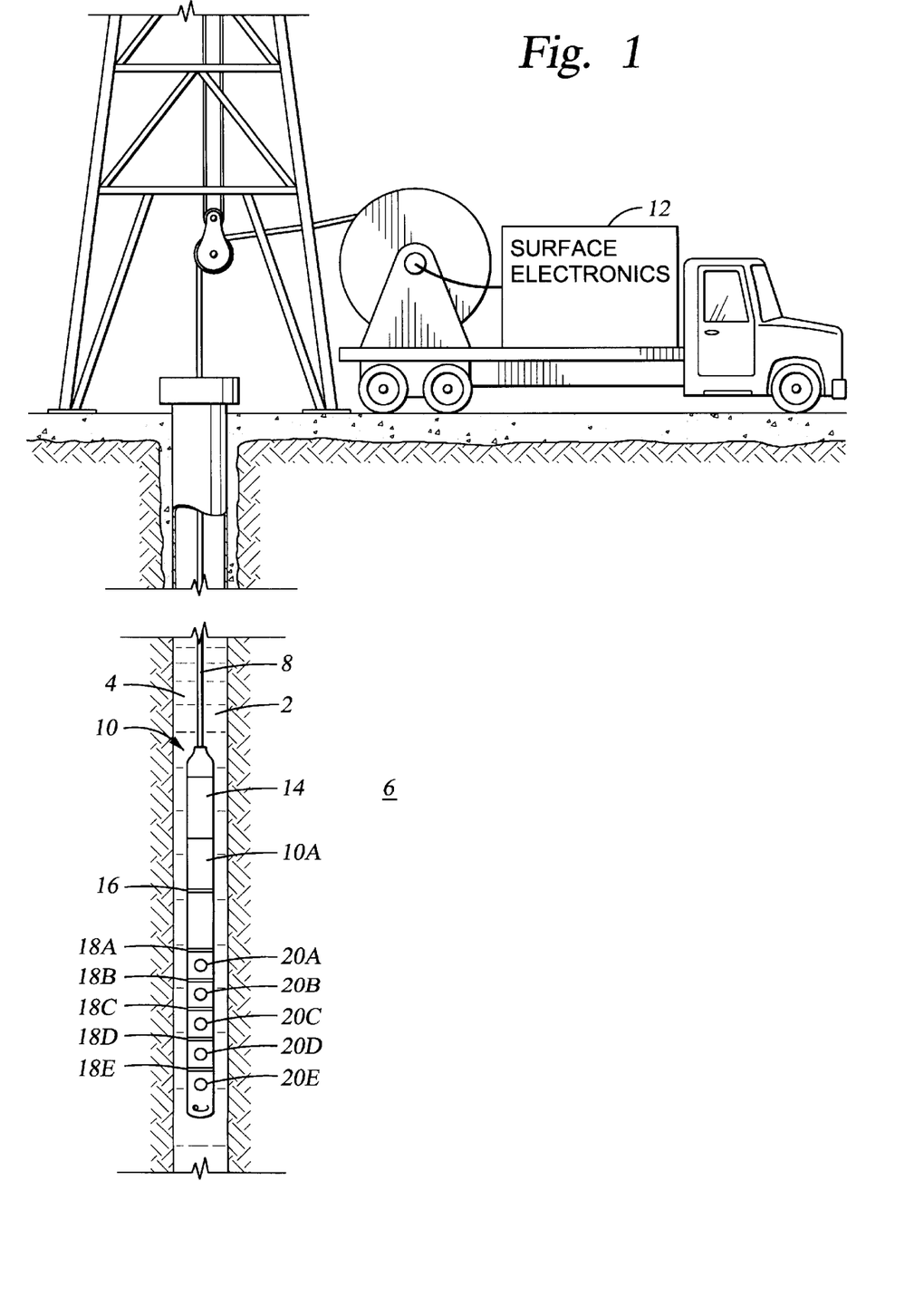
FIG. 1 shows an acoustic/seismoelectric logging instrument according to the invention as used in a wellbore penetrating earth formations.

An apparatus for making combined seismoelectric and acoustic measurements in a wellbore is shown generally in FIG. 1. The instrument 10 can be lowered into and withdrawn from a wellbore 2 drilled through earth formation 6 by means of an armored electrical cable 8 or any other similar conveyance known in the art. The instrument 10 includes an elongated mandrel 10A on which are included an acoustic energy source, or transmitter 16, and an array of acoustic receivers 20A–20E positioned at axially spaced apart locations along the mandrel 10A. The transmitter 16 and receivers 20A–20E can be of types well known in the art, and respectively can transmit and receive compressional acoustic energy and/or flexural acoustic energy.

The transmitter 16 is periodically actuated and imparts acoustic energy impulses into a liquid 4 filling the wellbore 2. The acoustic energy impulses travel through the liquid 4 and eventually reach the wellbore 2 wall where they interact with and propagate along the earth formations 6 forming the wellbore wall. Eventually some of the acoustic energy reaches the acoustic receivers 20A–20E where it is detected and converted into electrical signals. The receivers 20A–20E can be electrically connected to a telemetry/controller unit 14 which can format the signals from transmission to a surface electronics unit 12 for recording and interpretation. The telemetry/controller unit 14 may itself include suitable recording devices (not shown separately) for storing the receiver signals until the instrument 10 is withdrawn from the wellbore 2.

The instrument 10 also includes electrodes 18A–18E which are positioned at axially spaced apart locations from the transmitter 16. The electrodes 18A–18E can be of any type well known in the art for detecting electrical voltages from within the wellbore 2. The electrodes 18A–18E can also be electrically connected to the telemetry/controller unit 14 for conditioning and transmission of the voltage measurements to the surface electronics 12 for recording and interpretation.

Figure 2:
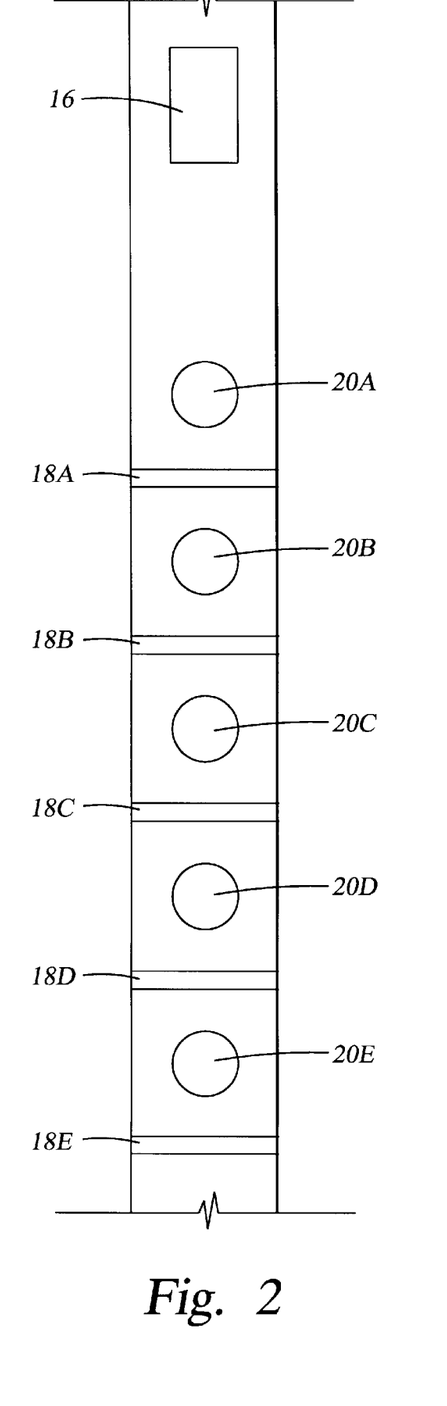
FIG. 2 shows a portion of the instrument in FIG. 1 in more detail, particularly an arrangement of electrodes and acoustic receivers.
Figure 3:
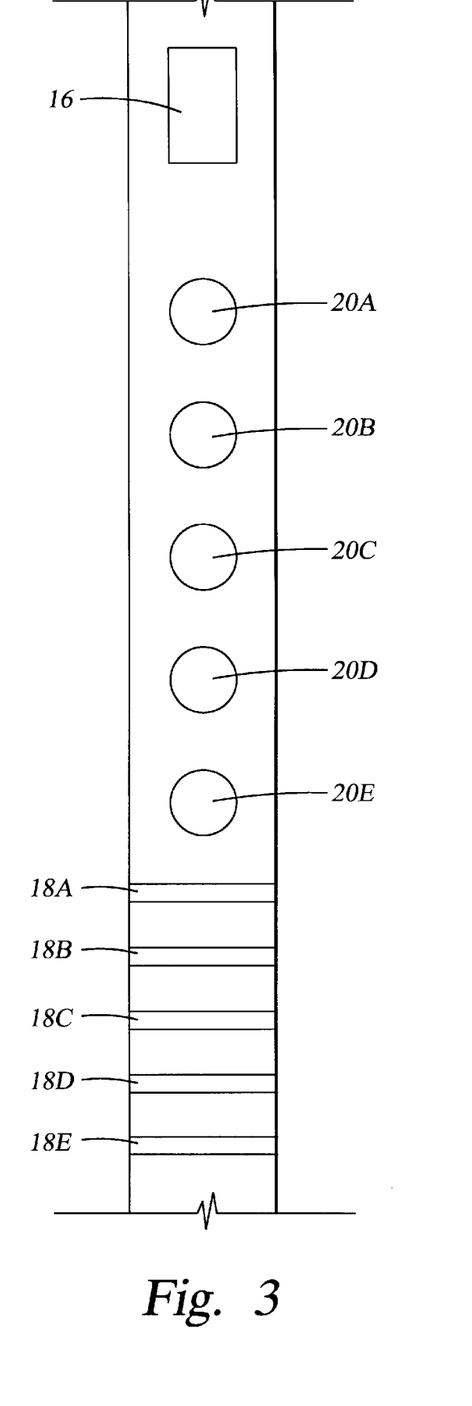
FIG. 3 shows an alternative arrangement of electrodes and acoustic receivers for the portion of the instrument as shown in FIG. 2.

One arrangement of the electrodes 18A–18E and the acoustic receivers 20A–20E is shown in FIG. 2. Typically the axial spacing between each one of the acoustic receivers 20A–20E is about 6 to 12 inches. The axial spacing between each one of the electrodes 18A–18E can be about the same amount. Preferably the portion of the instrument mandrel 10A on which the electrodes 18A–18E are disposed includes an electrically insulating exterior surface (not shown separately), such as can be made from fiberglass or similar material, to enable the electrodes 18A–18E to detect electrical voltages from within the wellbore (2 in FIG. 1). An alternative arrangement of electrodes 18A–18E can be observed in FIG. 3, where the electrodes 18A–18E are axially interspaced between the acoustic receivers 20A–20E. It should be noted that the configuration in FIG. 3 has the advantage, for reasons which will be further explained, of simplifying calculations of certain properties of the earth formations (6 in FIG. 1) because the relative distance between the transmitter 16, and both the acoustic receivers 20A–20E and the electrodes 18A–18E is substantially the same. Therefore the arrangement shown in FIG. 3 is preferred, but the arrangement shown in FIG. 2 is provided as an example of an arrangement of electrodes and receivers which will also make suitable measurements for processing by the method of this invention. The arrangement of electrodes and receivers in FIG. 2 is provided to illustrate that an apparatus which can make measurements for use with the method of the invention is not limited to only one configuration of electrodes and acoustic receivers. As is the case for the arrangement of FIG. 2, in the arrangement shown in FIG. 3 the mandrel 10A preferably has an electrically non-conductive exterior surface to avoid substantial effect on the voltage measurements made by the electrodes 18A–18E.

2. Theory of the Seismoelectric Effect and Synthesis of Seismoelectric Waveforms from Acoustic Signals The use of acoustic energy sources to excite electrical and electromagnetic responses (called the "seismoelectric effect") in earth formations has been studied at various times since the 1930's. See for example Thompson (1936), Belluigi (1937), Martner and Sparks (1959), Russell and Barker (1991). The seismoelectric effect exhibited in a fluid-saturated porous medium, such as certain earth formations, represents a coupling and a conversion between acoustic energy and electric energy. Acoustic waves propagating through a fluid-saturated porous medium can cause movement of the fluid present in the pore spaces of the porous medium relative to the solid portion of the porous medium (referred to as the "matrix"). When the fluid in the pore spaces is moved, the motion of cations in the fluid can form a streaming electrical current. The streaming electrical current acts as an electrical current source which can be described by Maxwell's equations. The streaming electrical current also induces an electric field inside the porous medium and causes radiation of an electromagnetic wave at any discontinuous interface (either an electrical or mechanical interface) within the porous medium.

In the terminology of earth formations, a discontinuous interface is generally referred to as a "bed boundary".

When an acoustic wave impinges on a fluid saturated porous medium, the driving force for the movement of the fluid in the pore spaces of the medium is a combination of pressure gradients set up by the peaks and troughs of a compressional acoustic wave, and by accelerations of solid particles (the "grains") forming the matrix of the porous medium. The relative flow caused by grain accelerations can be induced by both compressional acoustic waves and by shear (flexural) acoustic waves.

In a fluid-saturated porous medium, the coupling between the acoustic waves and the electric fields can be described by the following expression:

$$J = \sigma(\omega)E + L(\omega)[-\nabla P + \rho_f \omega^2 u_s] \qquad (1)$$

where J represents the electric current density, E represents the electric field magnitude, $u_s$ represents the displacement of the solid portion of the porous medium; P represents the pore fluid pressure, $\rho_f$ represents the pore fluid density, $\sigma(\omega)$ represents the overall electrical i conductivity of the porous medium as a function of frequency $\omega$, and $L(\omega)$ represents a frequency-dependent electrokinetic coupling coefficient which can be determined by the following expression (See Mikhailov et al (1997)):

$$L(\omega) = \frac{\phi \zeta \epsilon_f}{\alpha_\infty \eta \left(1 - i\omega \frac{\alpha_\infty \rho_f \kappa_0}{2\phi\eta}\right)^{1/2}} \quad (2)$$

where $\zeta$ represents the so-called "zeta-potential" as determined by the electrochemical interaction between the pore fluid and rock, $\kappa_0$ represents the formation permeability, E represents the viscosity of the fluid in the pore spaces of the porous medium, ø represents the fractional volume of pore space in the porous medium (called "porosity"), and $\alpha_\infty$ represents a measure of the overall length of an average path connecting individual pore spaces within the porous medium with respect to a particular straight-line distance across the porous medium (called the pore "tortuosity").

Maxwell's field equations as related to these electric fields can be written as:

$$\nabla \times H = -i\omega D + J \quad (3)$$

$$D = \left[\frac{\phi}{\alpha_\infty}(\epsilon_f - \epsilon_s) + \epsilon_s\right] E$$

where D represents the electric displacement, H represents the magnetic field magnitude, $\epsilon_f$ and $\epsilon_s$, represent, respectively, the pore fluid and matrix dielectric permittivities. Combining the expressions in equations (1) and (2) provides the expression:

$$\left\{i\omega \left[\frac{\phi}{\alpha_\infty}(\epsilon_f - \epsilon_s) + \epsilon_s\right] - \sigma(\omega)\right\} \nabla \cdot E = \quad (4)$$

$$L(\omega)[-\nabla^2 P + \rho_f \omega^2 \nabla \cdot u_s]$$

To simplify a solution to this problem, an approach proposed by Tang et al can be used. See Tang et al (1991). In the approach described by Tang et al, the matrix displacement in equation (3) can be approximated as the displacement of an equivalent elastic medium whose acoustic properties are similar to those of the fluid-saturated porous earth formation. The pressure in the fluid in the pore spaces as used in equation (3) can be approximated as due to the dynamic fluid exchange occurring at the wellbore wall (that is, neglecting the pressure disturbance due to motion of the matrix). Expressed in cylindrical coordinates, the pressure, after operated upon by $\nabla^2$, can be described by the expression:

$$\nabla^2 P(\omega, k, r) = \quad (5)$$

$$-e^{ikz} \frac{i\omega}{C} S(\omega) GI_0(fR) \frac{K_0\left(r\sqrt{-i\omega/C + k^2}\right)}{K_0\left(R\sqrt{-i\omega/C + k^2}\right)} ;$$

$$(r \geq R)$$

where k represents the wavenumber; $f=(k^2-\omega^2/V_f^2)^{1/2}$, $V_f$ represents the acoustic speed of the liquid in the wellbore, z represents the axial position within the wellbore, r represents radial distance, R represents radius of the wellbore; $I_n$ and $K_n$ (n=0, 1), represent an n-th order modified Bessel function of the first and second kind, respectively. C represents the dynamic pore fluid diffusivity (which includes the pore fluid mobility, the mobility being directly related to permeability), $S(\overset{4}{v})$ represents the Fourier (frequency) spectrum of the acoustic energy source; and G represents the borehole wave pressure excitation due to the acoustic source. In particular, the following expression:

$$P(\omega, R) = e^{ikz} S(\omega) GI_0(fR) \quad (6)$$

characterizes a propagating pressure wave along the wellbore. Using the equivalent elastic formation method, the divergence of the displacement in an elastic formation can be described by the expression:

$$\nabla \cdot u_s = e^{ikz} S(\omega) GI_1(fR) \frac{(2k^2 - \omega^2/V_s^2)f}{\rho_b V_p^2 l \omega^2/V_s^2} \frac{K_0(lr)}{K_1(lR)} ; \quad (7)$$

$$(r \geq R)$$

where $l=(k^2-\omega^2/V_p^2)^{1/2}$. See Cheng and Toksöz (1981). $V_p$ represents compressional-wave velocity in the medium (earth formation), and $\rho_b$ represents the density of the liquid in the wellbore. Substituting equations (4) and (6) into equation (3) and expressing E using an electric potential $\Phi$ ($E = -\nabla\Phi$) provides the expression:

$$\nabla^2 \Phi = M(\omega) e^{ikz} S(\omega) G \left[AK_0\left(r\sqrt{-i\omega/C + k^2}\right) + BK_0(lr)\right] ; \quad (8)$$

$$(r \geq R)$$

where the coefficients M, A, and B in equation (8) can be determined by the expressions:

$$M(\omega) = \frac{L(\omega)}{i\omega[\phi/\alpha_\infty(\epsilon_f - \epsilon_s) + \epsilon_s] - \sigma(\omega)} \quad (9)$$

$$A = \frac{(-i\omega/C)I_0(fR)}{K_0\left(R\sqrt{-i\omega/C + k^2}\right)}$$

$$B = \frac{\rho_f \omega^2}{\rho_b V_p^2} \frac{(2k^2 - \omega^2/V_s^2)f}{l\omega^2/V_s^2} \frac{I_1(fR)}{K_1(lR)}$$

Because there is no electrical source located within the liquid (4 in FIG. 1) in the wellbore, the electric potential in the wellbore (2 in FIG. 1) satisfies the Laplace equation:

$$\nabla^2 \Phi_b = 0; \quad (r \leq R) \quad (10)$$

The electric potentials in the wellbore 2 and the earth formations (6 in FIG. 1) are related by the continuity of electric potential and the electric current across the wellbore wall as given by the following boundary conditions:

$$\Phi_b = \Phi \quad (11)$$

$$\left\{-\sigma_b \frac{\partial \Phi_b}{\partial r} = -\sigma(\omega) \frac{\partial \Phi}{\partial r} + \right.$$

$$\left. L(\omega)\left[-\frac{\partial P}{\partial r} + \rho_f \omega^2 u_{sr}\right] ; (r = R)\right.$$

where $\sigma_b$ represents the electrical conductivity of the liquid 4 in the wellbore 2 and $\mu_{sr}$ represents the radial displacement of the matrix. Solving equations (8) and (10) in conjunction with the boundary conditions described by equation (11), the electric potential in the liquid 4 in the wellbore 2 can be determined by the expression:

$$\Phi_b(k, \omega, r) = [S(\omega)GI_0(fR)e^{ikz}] \frac{M(\omega)I_0(kr)}{k\left[I_0(kR)K_1(kR) + \frac{\sigma_b}{\sigma(\omega)} I_1(kR)K_0(kR)\right]} \times \quad (12)$$

$$\left\{ kK_1(kR) - \left[1 + \frac{L(\omega)}{\sigma(\omega)M(\omega)}\right] \sqrt{-i\omega/C + k^2} \frac{K_1\left(R\sqrt{-i\omega/C + k^2}\right)}{K_0\left(R\sqrt{-i\omega/C + k^2}\right)} K_0(kR) - \right.$$

$$\left. \frac{\rho_f}{\rho_b} \left\{ kK_1(kR) \frac{K_0(lR)}{K_1(lR)} - \left[1 + \frac{L(\omega)}{\sigma(\omega)M(\omega)}\right] lK(kR) \right\} \frac{(2k^2 - \omega^2/V_s^2)f}{l\omega^2/V_s^2} \frac{I_1(fR)}{I_0(fR)} \right\}$$

The first term on the right-hand side in the square brackets [ ] in equation (12) is exactly the wellbore wave pressure as determined from equation (6). The rest of the terms in equation (12) are coefficients describing the conversion from the pressure wave to an electric wave in the wellbore 2. Equation (12) represents a general case, wherein the electric potential induced by an acoustic wave traversing earth formations can be calculated for all of the types of acoustic waves generated by typical acoustic wellbore logging instruments. These wave types, as is known in the art include compressional waves, shear waves and Stoneley waves.

In equation (12), the Fourier (frequency) spectrum of the electric potential can be computed by the expression:

$$\Phi_b(\omega, r, z) = \frac{1}{2\pi} \int_{-\infty}^{+\infty} \Phi_b(k, \omega, r) dk \quad (13)$$

Finally, a time series of the electric signal in the wellbore 2 can be determined by the expression:

$$\Phi_b(t, r, z) = \frac{1}{4\pi^2} \int_{-\infty}^{+\infty} e^{-i\omega t} d\omega \int_{-\infty}^{+\infty} \Phi_b(k, \omega, r) dk \quad (14)$$

The seismoelectric effect associated with a Stoneley wave in the wellbore 2 is of particular interest because the seismoelectric effect is closely related to fluid mobility in the earth formation 6. At low frequencies (about 1 KHz) where the Stoneley wave is predominant in a typical wellbore acoustic wavetrain, the seismoelectric wave spectrum from equation (13) can be obtained using the residue theorem, as can be determined by the expression:

ability effect on the Stoneley wavenumber can be calculated by the theory described in the Tang et al (1991) reference, which describes the attenuation and dispersion of Stoneley waves in porous earth formations penetrated by a wellbore. The expression in equation (15) can be used to synthesize the seismoelectric signal which results from Stoneley waves traversing the wellbore.

The first term in the square bracket [ ] in equation (15) is recognizable as the Stoneley wave along the wellbore (see equation (6)), whose propagation characteristics can be determined by the propagation factor $e^{ikz}$. It has been determined that the electric waves resulting from the seismoelectric effect will have substantially the same propagation characteristics as those of the 5 acoustic waves. See equation (12). At low frequencies (about 1 KHz), however, the seismoelectric effect will have substantially the same propagation characteristics as Stoneley waves. See equation (15). More importantly, the amplitude of the electric wave is directly proportional to the electrokinetic coupling coefficient $M(\omega)$, which is a strong function of the chemistry and the electrical conductivity of the fluid in the pore spaces of the earth formation 6. Equally important is that the electric wave amplitude is also controlled by electrical conductivity and formation porosity. This result, as will be further explained, enables determination of formation porosity and fluid conductivity by joint processing of the seismoelectric and acoustic measurements.

An interesting feature can be inferred from the theoretical result from equations (11) and (15) that can have important implications to seismoelectric wellbore logging using a nonconductive liquid in the wellbore (i.e., some oil-based muds). For a nonconductive borehole fluid ($\sigma_b$ being equal $$\Phi_b(\omega, r) = \left\{ [S(\omega)GI_0(fR)e^{ikz}] \frac{iM(\omega)I_0(kr)}{k\left[I_0(kR)K_1(kR) + \frac{\sigma_b}{\sigma(\omega)} I_1(kR)K_0(kR)\right]} \times \right.$$

$$\left. \left[ kK_1(kR) - \left[1 + \frac{L(\omega)}{\sigma(\omega)M(\omega)}\right] \sqrt{-i\omega/C + k^2} \frac{K_1\left(R\sqrt{-i\omega/C + k^2}\right)}{K_0\left(R\sqrt{-i\omega/C + k^2}\right)} K_0(kR) \right] \right\}_{Stoneley} \quad (15)$$

In deriving equation (15), the last term in the brackets { } from equation (12) has been neglected because it is very small at lower frequencies. The wavenumber $k=k_{st}$ now represents the Stoneley wavenumber. The Stoneley wavenumber can be determined by locating the Stoneley wave pole in the wavenumber k-plane. See Cheng and Toksöz (1981). Equation (15) can be ) evaluated at the Stoneley wavenumber for each frequency. Furthermore, the permeto zero), the wellbore seismoelectric signal determined from equations (12) or (15) does not vanish as long as the seismoelectric coupling is not eliminated by wellbore liquid invasion into the pore spaces of the earth formation (i.e., $M(\omega)$ is not equal to zero). It is contemplated that the electrodes (18A–18E in FIG. 2) can alternatively be adapted to be placed in contact with the wellbore wall, using mounting arrangements well known in the art, to enable measurement of the voltages induced in the formations 6 by acoustic waves when the liquid 4 is electrically non-conductive.

Figure 4:
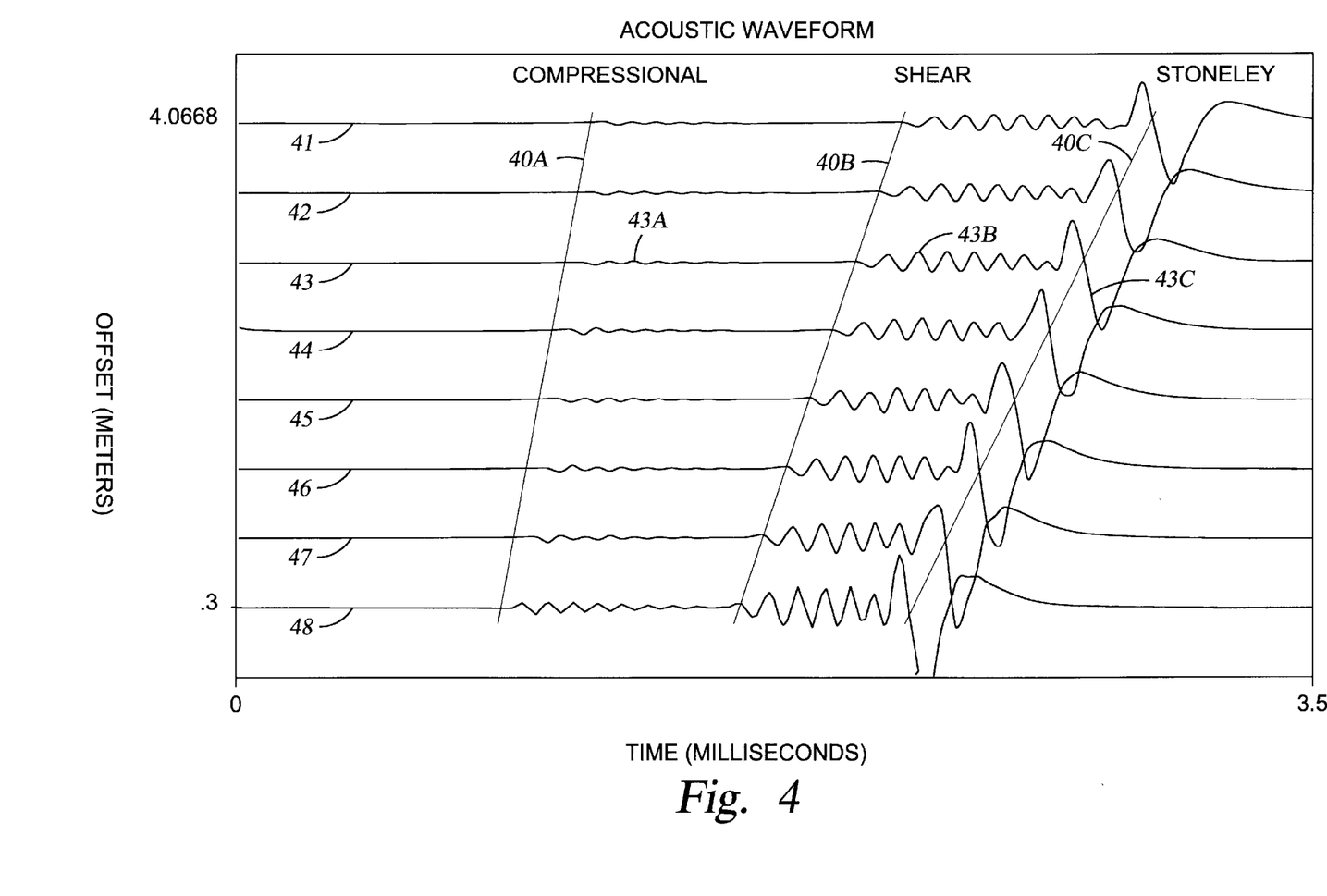
FIG. 4 shows a set of acoustic waves measured by an instrument such as shown in FIG. 1, when the instrument is used in a liquid-filled wellbore.
Figure 5:
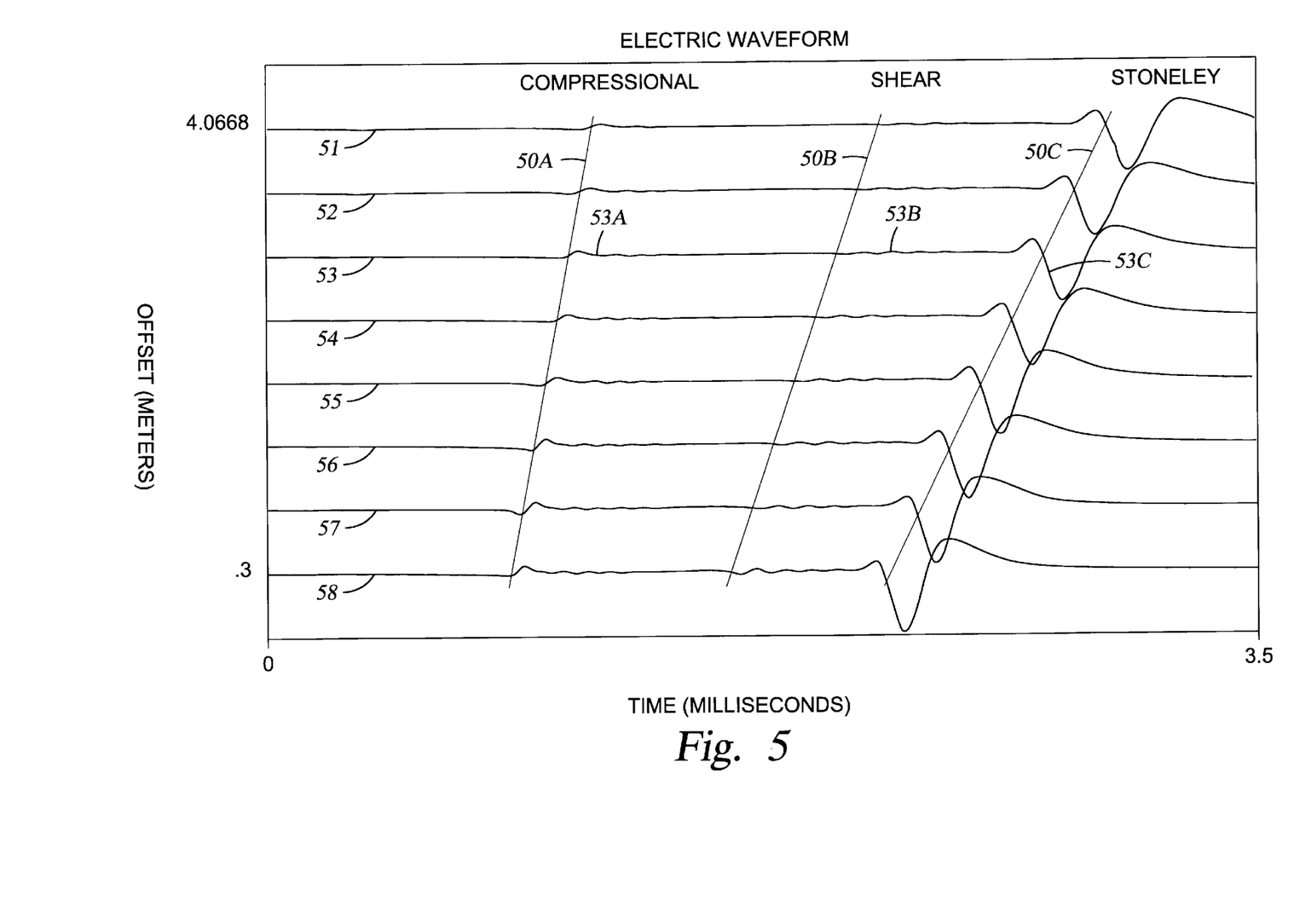
FIG. 5 shows seismoelectric waves synthesized according to a procedure described in this disclosure from measured acoustic waves such as shown in FIG. 4.

An example of synthesis of seismoelectric wave signals using the procedure just described is shown in FIGS. 4 and 5. FIG. 4 shows a graphic representation of acoustic signals detected by each one of the receivers on a well logging instrument such as the one shown in FIG. 1. The signals are shown as curves 41–48. Events corresponding to arrival of compressional, shear and Stoneley wave energy can be observed, for example in curve 43 at 43A, 43B and 43C, respectively. As is known in the art, the difference in arrival time between the individual receiver signals for each of the events (such as 43A, 43B, 43C for curve 43) can be related to the propagation velocity of the acoustic energy form which generated the particular event. These differences are observable as "moveout" curves 40A, 40B and 40C for the compressional, shear and Stoneley wave velocities, respectively.

Seismoelectric waves can be synthesized using equation (12). Synthetic seismoelectric signals generated from each of the acoustic signals in FIG. 4 are shown in FIG. 5 at curves 51–58. Just as in the acoustic wave signal curves shown in FIG. 4, the synthetic seismoelectric waveforms shown in FIG. 5 show compressional, shear, and Stoneley-wave features, as shown at 53A, 53B and 53C for curve 53. Moveout curves 50A, 50B and 50C are also observable in the synthetic seismoelectric curves 51–58. The synthetic seismoelectric curves 51–58, however, more closely resemble acoustic signals which have been passed through a low-pass filter. In FIG. 5, this can be observed as substantially reduced amplitude of the compressional 53A and shear 53B features compared to the comparable features in the signal waveforms of FIG. 4, while the amplitude of the Stoneley wave feature 53C remains relatively large. Of particular interest is that the Stoneley wave feature is the most prominent wave feature in the synthetic seismoelectric waveforms 51–58. This result, wherein the seismoelectric Stoneley-wave feature 53C has a relatively large amplitude, is clearly suggested by equation (15). The example in FIG. 5 suggests that a low-frequency Stoneley wave feature will predominate in the seismoelectric signals measured in a wellbore. Because of the predominance of the Stoneley wave features in the seismoelectric wave, it may be preferable to use equation (15) to synthesize seismoelectric waves from the measured acoustic waves, because equation (15) can be calculated much more quickly than can equation (12), since higher-frequency components are substantially ignored in the calculation of equation (15).

3. Method for Determining Earth Formation Parameters by Joint Processing of Seismoelectric Voltage and Acoustic Wave Measurements Using the preceding theory, combined acoustic and seismoelectric measurements made over the same axial interval of the wellbore can be processed using an inversion procedure to correlate and derive formation porosity and a measurement related to pore fluid chemistry (electrical conductivity) of the fluid in the pore spaces.

The first step in the inversion procedure is to indicate the effects associated with porosity and fluid electrical conductivity by deconvolution. Deconvolution is based on the fact that the measured seismoelectric signal represents a convolution of the acoustic signal (measured in the wellbore over substantially the same axial formation interval) with the formation seismoelectric "coupling" response which is shown in equations (12) and (15). The seismoelectric coupling response is related to the porosity and to the pore fluid conductivity. Mathematically, the convolution can be described in the time domain by the expression:

$$E(t)=A(t)* R(t) \tag{16}$$

The convolution can also be described in the frequency domain by the expression:

$$E(f)=A(f)\cdot R(f) \tag{17}$$

E and A in equations (16) and (17) represent, respectively, the measured seismoelectric and measured acoustic signals, and the symbol * indicates convolution. R represents the seismoelectric coupling response of the earth formations as a function of time t or as a function of frequency $f$. From equations (16) and (17), it is apparent that by deconvolution it is possible to obtain the formation seismoelectric coupling response either in the time domain or in the frequency domain. Determining the seismoelectric coupling response R enables determination of the formation porosity and the fluid conductivity.

The formation porosity and fluid conductivity can be quantitatively calculated by inversion. This consists of formulating an inversion procedure to extract these properties from the measured acoustic and measured seismoelectric signals. Specifically, this procedure consists of generating a synthetic seismoelectric signal from the measured acoustic signal and comparing the synthetic signal with the measured seismoelectric signal. The synthetic seismoelectric signal can be generated using the theoretical model as shown in equations (12) through (15). It should be noted that any commonly used type of acoustic signal measurement can be used to generate the synthetic seismoelectric signal, including compressional signals, shear (or flexural) signals, and Stoneley wave signals. If compressional or shear acoustic signals are used to synthesize the seismoelectric signals, then equation (12) should be used to determine the coupling effect (see FIG. 5). If Stoneley waves are used to generate the synthetic seismoelectric signals, then equation (15) can be used to determine the coupling effect. The time series of the seismoelectric signals can be calculated in either event by using equation (14). The advantage of combining acoustic and seismoelectric measurements in a single logging instrument is that these measurements combined directly provide the required acoustic signal used in the synthetic modeling of the seismoelectric signal. Therefore, the synthetic seismoelectric signal can be calculated by convolving the measured acoustic signal with the theoretical seismoelectric response function, as shown in equation (16) or (17).

Initial values of formation porosity and fluid conductivity can be selected from a range of known possible values for these properties. Differences can be calculated, for any formation axial interval of interest, between the seismoelectric measurements made by the well logging instrument (10 in FIG. 1) and the synthetic seismoelectric signal generated by the modeling method using equations (12) through (15). The differences can be either summed in the frequency domain, or summed over a time window during which acoustic and electrical signals are measured (typically about 5,000 microseconds for a typical acoustic well logging instrument), to generate an objective function such as described by the following expressions:

$$OBJ(p) = \begin{cases} \sum_{n_t} [E_{syn}(p, n_t) - E_{msd}(n_t)]^2/\sigma_{n_t}^2 \\ \sum_{n_f} [E_{syn}(p, n_f) - E_{msd}(n_f)]^2/\sigma_{n_f}^2 \end{cases} \quad (18)$$

where p represents a formation porosity and fluid conductivity parameter vector, $n_t$ and $n_f$ represent, respectively, the total number of time domain and frequency domain measurements. $E_{syn}$ and $E_{msd}$ represent the synthetic and the measured seismoelectric signals; $\sigma_{n_t}^2$ and $\sigma_{n_f}^2$ represent, respectively, the variance of the n-th time and frequency domain measurements. The upper expression is an objective function for time domain analysis, and the lower expression is an objective function for frequency domain analysis.

If the value of the objective function exceeds a predetermined threshold, then the model parameters in vector p can be adjusted, and a new synthetic seismoelectric signal can be calculated using the modeling procedure previously described. The value of the threshold will depend on the type of seismoelectric and acoustic measurements being synthesized, as well as whether the system operator has imposed external constraints on the model, such as known upper and lower bounds of the range of values of the formation porosity and fluid conductivity. The process of adjusting the model parameters, resynthesizing the well log electrical data, and comparing the synthetic response to the measured well log data continues until either the objective function value falls below the predetermined threshold or the value of the objective function reaches a minimum. Methods for determining the minimum value of the objective function are known in the art. The actual method for determining the minimum value of the objective function is a matter of discretion for the system designer and is not intended to be a limitation on the invention.

The values of the model parameters which cause the value of the objective function to reach a minimum are generally taken to be the values for the model parameters p which most closely approximate the values of the porosity and fluid conductivity of the earth formations.

Since the logging instrument configurations shown in FIGS. 2 and 3 have both acoustic receivers and electrodes, acoustic logging and seismoelectric measurements can be conducted at the same time over the same axial interval in the earth formations. This will provide two different types of signal measurements made over the same axial interval in the earth formations. Propagation of the acoustic waves is mainly affected by the elastic properties of the earth formations. The seismoelectric signals, however, are primarily affected by porosity and pore fluid chemistry (conductivity). If, for example, the acoustic waves traverse two different layers of the earth formations, each having similar elastic properties but very different values of porosity, the acoustic signals alone cannot distinguish between the two different earth formations. Including the seismoelectric measurements for the same formations, however, will provide different results, since the porosity is one of the main factors affecting the seismoelectric effect. A formation interval having high porosity will generally have a much larger seismoelectric signal than that of a formation having low porosity. By subtracting or dividing two normalized data sets (acoustic and seismoelectric measurements), it is possible to identify porosity changes in the formation as the well logging instrument traverses the formation.

Another application of combined acoustic and seismoelectric measurements is locating two formation zones having high fluid chemistry (conductivity) contrast between them. For example, a formation having a particular value of porosity, saturated with water in one zone, and saturated with oil in another zone, will have virtually indistinguishable acoustic log measurements in each of the two intervals if the density of the oil is nearly the same as that of the water. The seismoelectric measurements, however, are substantially affected by the pore fluid conductivity. Conductivity of the pore fluid is directly related to its chemical (dissolved free ion) content. In the water saturated zone, the seismoelectric effect will be much larger than will be in the oil saturated zone. By comparing the acoustic and seismoelectric measurements in both an oil and in a water saturated interval, it is possible to identify the contact interface between the oil and the water saturated intervals of the formation using only an acoustic energy source to illumination the earth formation. Prior art methods for determining the position of an oil/water contact in an earth formation include measuring electrical resistivity or thermal neutron capture cross-section. The prior art methods are not able to determine the location of an oil/water contact using only acoustic energy to illuminate the formation.

According to the theory of seismoelectricity, when an acoustic wave propagates from a porous formation into a nonporous formation, a conversion between the acoustic and electric energies occurs at the interface between the two formations. A radiant electromagnetic signal is generated at the interface of two formations. The formations can include zones having primary (intergranular) porosity wherein one interval is porous and the other interval is non-porous. The formations can also include a fractured zone within a substantially non-porous formation interval. Radiation of an electromagnetic wave from the boundary between the porous and non-porous intervals can help to identify the boundary or any fracture zones existing in the formation, when acoustic and seismoelectric logging measurements are combined. When the logging instrument passes a boundary between a porous interval and a non-porous interval, the electrode array will record a strong electromagnetic response at the axial location of the boundary. Due to the near light speed of the electromagnetic wave, all of the electrodes will record the electromagnetic response at substantially the same time. Combining the radiant electromagnetic signal with the amplitude change of the seismoelectric signal along the wellbore, it is possible to identify the formation boundary, where the position of such boundary may not be apparent from acoustic logging signals alone.

When acoustic waves propagate through a fracture zone or a part of the wellbore which has become enlarged (known as "washout"), they will generate some reflection events in the acoustic logging data. The radiant electromagnetic signal generated by the seismoelectric effect will only appear at the fracture zone but not in a washout. By joint interpretation of the acoustic and seismoelectric data, one can distinguish a fracture zone and a washout in the formation.

Those skilled in the art will devise other embodiments of this invention which do not depart from the spirit of the invention as disclosed herein. Accordingly, the invention should be limited in scope only by the attached claims.

APPENDIX: References Cited in the Disclosure

Belluigi, A., 1937, *Seismic-electric prospecting,* The Oil Weekly, 38–42.

Butler, K. E., Russell, R. D., and Kepic, A. W., 1996, *Measurement of the seismoelectric response from a shallow boundary,* Geophysics, 61, 1769–1778.

Cheng, C. H., and Toksöz, M. N., 1981, *Elastic wave propagation in a fluid-filled borehole and synthetic acoustic logs,* Geophysics, 46, 1042–1053.

Kuznetsov, L. O., Kokorev, A. A. and Migunov, N. I., 1986, *Evaluating stressed state of mine rock strata involves measurement of electrical intensity and mechanical stress of seismic waves*, Soviet Union Patent No. 1208241 (Basic).

Martner, S. T., and Sparks, N. R., 1959, *The electroseismic effect*, Geophysics, 24, 297–308.

Mikhailov, O. V., Haartsen, M. W., and Toksöz, M. N., 1997, *Electroseismic investigation of the shallow subsurface: Field measurements and numerical modeling*, Geophysics, 62, 97–105.

Russell, R. D., and Barker, A. S., Jr., 1991, *Seismo-electric exploration: Expected signal amplitudes*, Geophysical Prospecting, 39, 105–118.

Tang, X. M., Cheng, C. H., and Toksöz, M. N., 1991, *Dynamic permeability and borehole Stoneley waves: A simplified Biot-Rosenbaum model*, Journal of the Acoustical Society of America, 90, 1632–1646.

Thompson, A. H., 1990, *Electro-seismic prospecting for presence of hydrocarbon (s) underground by seismic impact on gas-water interface or interface between other immiscible fluids*, German Patent No. 3941743 (Basic), U.S. Pat. No. 4,904,942.

Thompson, R. R., 1936, *The seismic electric effect*, Geophysics, 1, 327–335.

Zhu, Z. Y., and Toksöz, M. N., 1996, *Experimental studies of electrokinetic conversions in fluid-saturated porous media*, 66th Ann. Internat. Mtg., Society of Exploration Geophysicists, Expanded Abstracts, 1699–1702.

What is claimed is:

1. A method for estimating porosity of an earth formation from measurements of acoustic energy traversing said formation and from measurements of seismoelectric voltages generated in said formation in response to said acoustic energy, the method comprising:

calculating synthetic seismoelectric voltages from said measurements of said acoustic energy using an initial value of said porosity;

determining a difference between said synthetic seismoelectric voltages and said measurements of said seismoelectric voltages; and adjusting said initial value of said porosity, and repeating said steps of calculating said synthetic seismoelectric voltages, determining said difference and adjusting said value of porosity until said difference reaches a minimum.

2. The method as defined in claim 1 wherein said acoustic energy comprises compressional waves.

3. The method as defined in claim 1 wherein said acoustic energy comprises shear waves.

4. The method as defined in claim 1 wherein said acoustic energy comprises Stoneley waves.

5. The method as defined in claim 1 further comprising estimating conductivity of a fluid in pore spaces of said earth formation, comprising:

calculating said synthetic seismoelectric voltages using an initial value of said conductivity;

determining a difference between said synthetic seismoelectric voltages and said measured seismoelectric voltages; and adjusting said initial value of said conductivity, and repeating said steps of calculating said synthetic seismoelectric voltages, determining said difference and adjusting said value of conductivity until said difference reaches a minimum.

6. A method of well logging, comprising:

inserting a well logging instrument into a wellbore penetrating earth formations, said instrument including an acoustic energy source and at least one acoustic receiver axially spaced apart from said source, said instrument including electrodes at axially spaced apart locations from said source;

activating said source to impart acoustic energy pulses into said wellbore and said earth formations;

detecting acoustic energy at said at least one receiver and measuring a magnitude thereof;

measuring voltages at said electrodes;

calculating synthetic seismoelectric voltages from said measurements of said magnitude of said acoustic energy using an initial value of porosity of said earth formations;

determining a difference between said synthetic seismoelectric voltages and said measurements of said voltages; and adjusting said initial value of said porosity, and repeating said steps of calculating said synthetic seismoelectric voltages, determining said difference and adjusting said value of porosity until said difference reaches a minimum.

7. The method as defined in claim 6 wherein said acoustic energy comprises compressional waves.

8. The method as defined in claim 6 wherein said acoustic energy comprises shear waves.

9. The method as defined in claim 6 wherein said acoustic energy comprises Stoneley waves.

10. The method as defined in claim 6 further comprising estimating conductivity of a fluid in pore spaces of said earth formations, comprising:

calculating said synthetic seismoelectric voltages using an initial value of said conductivity;

determining a difference between said synthetic seismoelectric voltages and said measured voltages; and adjusting said initial value of said conductivity, and repeating said steps of calculating said synthetic seismoelectric voltages, determining said difference And adjusting said value of conductivity until said difference reaches a minimum.

11. A method for estimating electrical conductivity of fluid in pore spaces of an earth formation from measurements of acoustic energy traversing said formation and from measurements of seismoelectric voltages generated in said formation in response to said acoustic energy, the method comprising:

calculating synthetic seismoelectric voltages from said measurements of said acoustic energy using an initial value of said conductivity;

determining a difference between said synthetic seismoelectric voltages and said measurements of said seismoelectric voltages; and adjusting said initial value of said conductivity, and repeating said steps of calculating said synthetic seismoelectric voltages, determining said difference and adjusting said value of conductivity until said difference reaches a minimum.

12. The method as defined in claim 11 wherein said acoustic energy comprises compressional waves.

13. The method as defined in claim 11 wherein said acoustic energy comprises shear waves.

14. The method as defined in claim 11 wherein said acoustic energy comprises Stoneley waves.

15. The method as defined in claim 11 further comprising estimating porosity of said earth formation, comprising:

calculating said synthetic seismoelectric voltages using an initial value of said porosity;

determining a difference between said synthetic seismoelectric voltages and said measured seismoelectric voltages; and adjusting said initial value of said porosity, and repeating said steps of calculating said synthetic seismoelectric voltages, determining said difference and adjusting said value of porosity until said difference reaches a minimum.

* * * * *